(12) United States Patent
Pethick et al.

(10) Patent No.: US 12,519,159 B2
(45) Date of Patent: *Jan. 6, 2026

(54) BATTERY STACK CASING

(71) Applicant: Crompton Technology Group Ltd., Banbury (GB)

(72) Inventors: Jon Pethick, Leicestershire (GB); Robert Finney, Oxfordshire (GB); Paul Daniel Liddel, Banbury (GB); James William Bernard, Buckinghamshire (GB); Thomas Beale, Oxfordshire (GB); James Alexander Ashwell, Northamptonshire (GB)

(73) Assignee: CROMPTON TECHNOLOGY GROUP, LTD., Banbury (GB)

( * ) Notice: Subject to any disclaimer, the term of this patent is extended or adjusted under 35 U.S.C. 154(b) by 920 days.

This patent is subject to a terminal disclaimer.

(21) Appl. No.: 17/691,205

(22) Filed: Mar. 10, 2022

(65) Prior Publication Data

US 2022/0294047 A1    Sep. 15, 2022

(30) Foreign Application Priority Data

Mar. 10, 2021   (EP) ..................... 21275026

(51) Int. Cl.
*H01M 10/658*    (2014.01)
*H01M 10/0525*   (2010.01)
*H01M 50/124*    (2021.01)

(52) U.S. Cl.
CPC ..... *H01M 10/658* (2015.04); *H01M 10/0525* (2013.01); *H01M 50/124* (2021.01)

(58) Field of Classification Search
None
See application file for complete search history.

(56) References Cited

U.S. PATENT DOCUMENTS 5,084,313 A    1/1992  Missig et al.
10,610,714 B2  4/2020  Hariram
(Continued)

FOREIGN PATENT DOCUMENTS

CN    204144345 U    2/2015
CN    109428021 A    3/2019
(Continued)

OTHER PUBLICATIONS

CN-112582730-A Abstract Translation (Year: 2021).*
(Continued)

*Primary Examiner* — Kevin M Bernatz
(74) *Attorney, Agent, or Firm* — CANTOR COLBURN LLP

(57) ABSTRACT

A battery cell stack casing includes casing walls defining a housing interior for receiving a battery cell stack; a first end plate provided between the walls at a first end of the casing to close a first end of the housing interior. The casing also include a second end plate provided between the walls at a second end of the casing to close a second end of the housing interior. The casing walls have a multi-layer structure include: an inner layer having a first side facing into the housing interior and a second opposite side; an outer layer spaced outwardly from the second side of the inner layer; a thermally insulating volume defined between the second side of the inner layer and the outer layer, the thermally insulating material containing a low density thermally insulative material e.g., foam or other insulative material; and a layer of intumescent material provided on the first side of the inner layer.

12 Claims, 1 Drawing Sheet

(56) References Cited

U.S. PATENT DOCUMENTS

| | | | |
|---|---|---|---|
| 11,791,518 B2 * | 10/2023 | Zeng | H01M 10/6554 429/56 |
| 2006/0172192 A1 * | 8/2006 | Berkowitz | H01M 50/169 429/185 |
| 2014/0360344 A1 | 12/2014 | Pilpel et al. | |
| 2016/0254578 A1 | 9/2016 | Liu et al. | |
| 2018/0353784 A1 | 12/2018 | Hariram | |
| 2019/0181419 A1 * | 6/2019 | Suba | H01M 10/0525 |
| 2020/0303689 A1 | 9/2020 | Kinno et al. | |
| 2021/0184195 A1 * | 6/2021 | Eftekhari | H01M 10/6569 |
| 2021/0257690 A1 * | 8/2021 | Kilhenny | H01M 10/617 |
| 2022/0262539 A1 * | 8/2022 | Huang | B32B 5/26 |
| 2022/0294046 A1 * | 9/2022 | Pethick | H01M 10/658 |
| 2022/0416356 A1 * | 12/2022 | Hauenstein | H01M 10/625 |
| 2023/0030022 A1 * | 2/2023 | Walter | H01M 10/625 |
| 2023/0078486 A1 * | 3/2023 | Burke | H01M 10/658 429/97 |
| 2023/0142691 A1 * | 5/2023 | Aitharaju | H01M 50/233 429/99 |
| 2023/0231258 A1 * | 7/2023 | Boddakayala | H01M 50/209 429/86 |
| 2024/0088483 A1 * | 3/2024 | Kristy | B32B 25/20 |
| 2025/0015392 A1 * | 1/2025 | Nam | H01M 50/126 |
| 2025/0249658 A1 * | 8/2025 | Nam | B32B 27/286 |

FOREIGN PATENT DOCUMENTS

| | | | |
|---|---|---|---|
| CN | 110957450 A | | 4/2020 |
| CN | 210956783 U | | 7/2020 |
| CN | 112582730 A | * | 3/2021 |
| DE | 4334282 A1 | | 4/1995 |
| DE | 102010013150 A1 | | 9/2011 |
| JP | H01197967 A | | 8/1989 |
| WO | 2008104356 A1 | | 9/2008 |

OTHER PUBLICATIONS

Abstract for CN204144345 (U), published Feb. 4, 2015, 1 page.
Abstract for CN110957450 (A), published on Apr. 3, 2020, 1 page.
Abstract for CN210956783 (U), mailed Jul. 7, 2020, 1 page.
Abstract for DE102010013150 (A1), Published Sep. 29, 2011, 1 page.
Abstract for DE4334282 (A1), published Apr. 13, 1995, 1 page.
Abstract for JPH01197967 (A), Published Aug. 9, 1989, 1 page.
European Partial Search Report for Application No. 21275026.9, mailed Aug. 17, 2021, 15 pages.
European Search Report for Application No. 21275026.9, mailed Oct. 4, 2021, 15 pages.

* cited by examiner

BATTERY STACK CASING

CROSS-REFERENCE TO RELATED APPLICATIONS

This application claims priority to European Patent Application No. 21275026.9 filed Mar. 10, 2021, the entire contents of which is incorporated herein by reference.

TECHNICAL FIELD

The present disclosure is concerned with casings for battery cell stacks e.g. lithium-ion battery cell stacks.

BACKGROUND

Battery cells e.g.. Li-ion battery cells are usually assembled in a uniform 'stack' configuration to allow the application of compressive pressure in a spatially and weight efficient manner. The cells are assembled in a stack contained within a casing. The cell stacks require the casing to provide a compressive pre-load to the stack. For maximum cell stack performance, the compressive pre-load should be distributed evenly across the cell surface.

Thermal runaway (TR) can occur if a cell fails, for example, due to overcharging, deep discharge, overheating or some sort of mechanical impact or damage. A cell can rapidly increase in temperature and this can cause all of the cells in the stack to overheat in a thermal runaway effect, resulting in explosion of the cells and release of flammable and toxic fumes. This results in an increase in pressure and temperature inside the casing. To avoid the flammable and toxic fumes being released, the battery casing must be designed to contain the increased pressure. The casing is usually provided with a burst vent, which is designed to open when the internal pressure exceeds a burst level, to allow the fumes to be vented when and where it is safe to do so. Even when the burst vent opens, however, the temperature in the casing can continue to increase and can reach temperatures of, for example, 500 to 800 deg. C in large batteries. The battery case has to be designed to withstand high temperatures due to TR and to continue to seal the cell stack. This is particularly important in safety critical environments such as in aircraft or other vehicles in which a release of high temperatures from a battery can have catastrophic consequences. Whilst metal casings, e.g., stainless steel casings, are robust and can withstand high internal temperatures, such casings are large and heavy. In aircraft, for example, multiple cell stacks are often required and such metal casings are too heavy. It is important in aircraft and many other applications to minimise the size and weight of components such as battery units.

The use of insulative materials between the cell stack and the casing has been considered, so that lighter, thinner materials can be used as the casing material. The insulating material allows for a temperature gradient between the high cell temperature and the casing, so that it is not necessary for the casing to be made of a material that can withstand the very high temperatures that can occur on thermal runaway. Conventional oven insulation or fire blankets are usually not sufficient as they do not usually have sufficient stiffness to keep the cells in place and prevent them from moving. It is also difficult to use automated manufacturing processes with such insulation.

Another design considers the use of an intumescent material which swells when heated about a predetermined temperature. Such material can be provided between the cells and the casing to take up some of the heat generated by TR before it reaches the casing so that the casing material can be a thinner, lighter material. If, however, such materials are impregnated with resin during manufacture of the casing, they will not provide sufficient insulation from the very high temperatures to allow very light/thin casing materials. With such designs, the intumescent material is incorporated into the internal profile of the casing and the battery unit end cap. To avoid the casing deforming at the end cap seals when the intumescent material swells, and thus to retain the sealing at the end caps, reinforcing fibre hoops are added to the ends of the casing. A high temperature epoxy resin is injected into the casing and end plate structure. These hoop fibres, however, add significant weight and cost to the battery unit.

There is, therefore, a need for a light, low cost battery casing that can be produced by an automated manufacturing process and is rigid and strong and able to withstand the high temperatures that can occur inside the casing due to thermal runaway, whilst also maintaining a compressive load and also maintaining separation between the stack and the casing, e.g. by means of an insulative 'cage', to prevent battery cells contacting the casing.

SUMMARY

According to one aspect, there is provided a battery cell stack casing. The casing can include casing walls defining a housing interior for receiving a battery cell stack; a first end plate provided between the walls at a first end of the casing to close a first end of the housing interior. The casing can also include a second end plate provided between the walls at a second end of the casing to close a second end of the housing interior. The casing walls have a multi-layer structure that includes: an inner layer having a first side facing into the housing interior and a second opposite side; an outer layer spaced outwardly from the second side of the inner layer; a thermally insulating volume defined between the second side of the inner layer and the outer layer, the thermally insulating volume containing a low density insulative material; and a layer of intumescent material provided on the first side of the inner layer.

An insert e.g. of polymer may be fitted between the inner layer and the outer layer at the ends of the casing walls adjacent the end plates to fasten the end plates and to provide sealing of the leak path at the interface between the foam and the casing walls. The insert may provide a groove for a seal e.g. an elastomeric or adhesive bead seal at the interface between the insulative material and the inner and outer layers. Preferably, the groove is in the form of a female radial groove with a rectangular cross-section.

The end plates may also have a multi-layered structure.

The inner and outer layers may comprise carbon fiber reinforced polymer, CFRP. The insulative material may be foam or a similar low density material and is preferably a closed cell foam.

According to another aspect, there is provided a battery unit comprising a stack of battery cells and a casing as defined above within which the stack is mounted.

According to another aspect, there is provided a method of manufacturing a casing for a battery cell stack. The method includes: providing a mandrel; providing a layer of intumescent material around the mandrel; forming an inner casing layer over the layer of intumescent material, the intumescent material and the inner layer together defining inner side walls of the casing; providing a layer of low density insulative material over the inner casing layer; providing an outer layer of casing material over the insulative material to form outer side walls of the casing; providing an insert between the inner and outer walls of the casing at the ends; and securing an end plate to each end of the casing.

BRIEF DESCRIPTION OF THE DRAWINGS

Preferred embodiments of the invention will now be described by way of example only with reference to the drawings in which.

DETAILED DESCRIPTION

Figure 1:
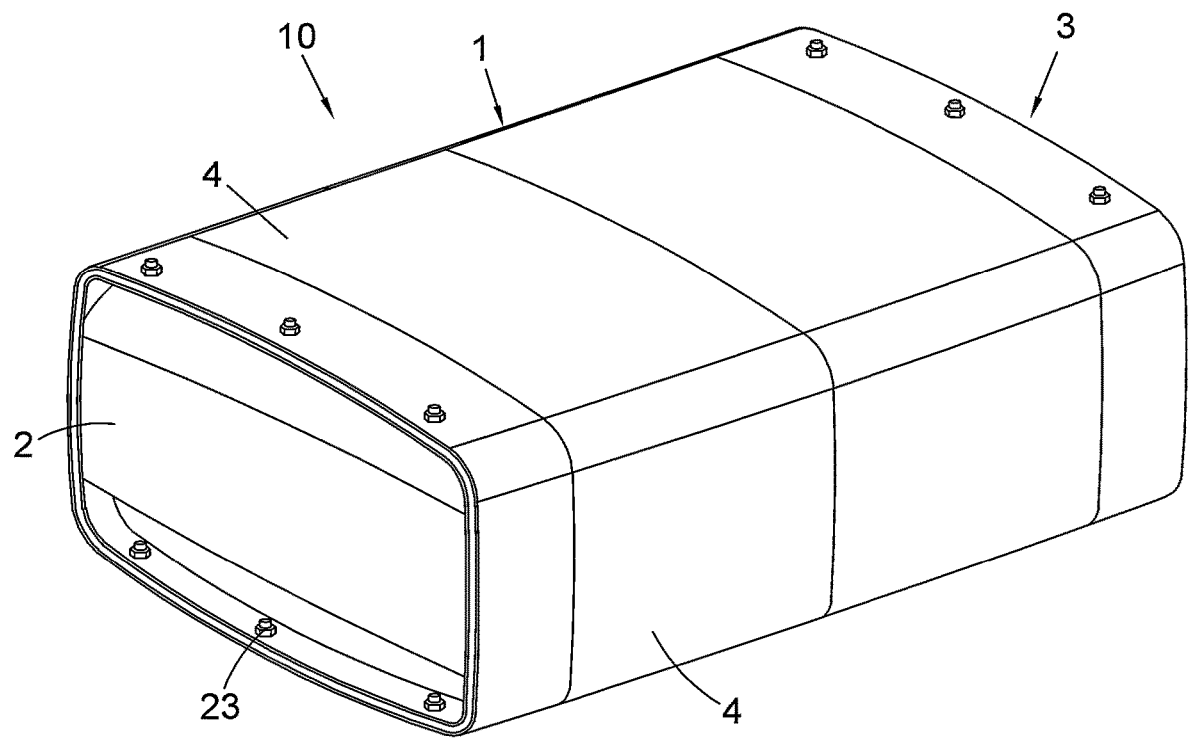
FIG. 1 is a perspective view of a battery casing according to the disclosure.

As best seen in FIG. 1, a casing 10 for a battery cell stack (not shown) is formed of casing walls 4 that define a housing 200 to accommodate a stack of battery cells (not shown). The casing 10 is also provided with end plates 2, 3 to sealingly close opposing ends of the casing 10. The end plates 2,3 are designed and assembled to provide a compressive loading to the opposing ends of the stack of cells mounted in the housing. The stack is arranged in the housing such that it does not contact the side walls 4 of the casing 10. For example, a cage structure or spacer arrangement may be provided between the stack and the casing inner surface.

As can be best seen in FIG. 2, the casing 10 of this disclosure has a multi-layer structure as will be described below.

Preferably, the end caps 2, 3 also have a multi-layer structure and are sealingly mounted to the ends of the casing and may be fixed e.g. by rivets or nuts and bolts 23.

The casing 10 is formed of an inner layer 11 and an outer layer 12 of casing material. Thus should be a relatively lightweight, but rigid and strong material e.g. a carbon fibre reinforced polymer (CFRP). The inner and outer layers 11, 12 are arranged to be spaced apart from each other to define a thermally insulating volume 13 therebetween.

The inner layer 11 defines the housing 200 interior for the cell stack (not shown). The outer layer 12 defines the outer surface of the casing 10. At the ends of the casing 10, the space between the inner and outer layers 11, 12 is closed by a plug or insert 15, which is made of a relatively rigid material e.g. a polymer, that can support seals and rivets or nuts and bolts. End caps 2, 3 are provided. These may have a conventional structure or may have the same multi-layer structure as the casing defining the side walls 4, having inner and outer CFRP layers 16, 17 defining, between them, a thermally insulating volume 18. The end caps 2, 3 are secured to the casing between the side walls 4 via seals 19, 20 and may be secured in place by rivets 23.

The inner casing layer 11 is further provided, on the inwardly facing side, with a layer of intumescent material 21.

Figure 2:
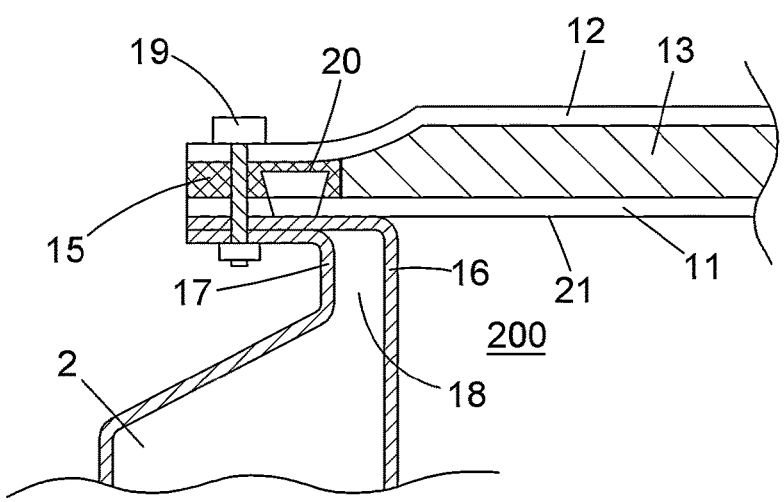
FIG. 2 shows a partial sectional view of a casing according to the disclosure.

In one embodiment, shown in FIG. 2, the thermally insulating volume 13 is provided with an insulative material for example foam such as (but not limited to) PMI or other low density foam. The foam is preferably a closed cell foam.

In the event of a fault, as described above, causing TR, even when the burst vent (not shown) opens, the temperature inside the housing 200 will increase. In a (non-limiting) example, the temperature might increase to high temperatures e.g. 550 to 600 deg. C or more.

The casing material for the inner and outer layers 11, 12 is selected to be light but strong and is, for example, CFRP. This will have a glass transition temperature Tg above which the casing material no longer keeps its shape and structure and so the casing material no longer provides effective sealing and loading. CFRP materials will have a Tg of less than the high temperatures (e.g. 600 deg. C) that can occur in the housing. For example only, the CFRP material might have a Tg of around 260 deg. C. The combination of the thermal insulating volume 13 and the intumescent layer 21 provides a thermal barrier between the interior of the housing 200 and the outer casing layer 12.

The layer of intumescent material 21 acts as a first barrier stage. This material may be, for example, a graphite/mineral wool mix. When the temperature inside the housing reaches a predetermined temperature, the intumescent material will swell and thermally insulate. The temperature at the interface of the intumescent material and the casing, however, will still be higher (e.g., around 360 deg. C) than the glass transition temperature Tg of the casing material. The thermal insulating volume 13, therefore, provides a second barrier stage, further thermally insulating to reduce the temperature at the interface at the outer casing layer 12 to be below Tg (e.g., to around 200 deg. C).

The thermal insulating volume itself would not suffice to create the required temperature reduction. Most available foams would be flammable at the high temperatures expected inside the housing. The intumescent layer itself may also not suffice since its thermal conductivity is not sufficiently low to limit the transfer of heat into the CFRP layer to an acceptable amount. The combination, however, of the intumescent layer and the thermally insulating volume allows the high temperatures that can build up inside the housing to be reduced to temperatures below Tg of a lightweight casing material such as CFRP.

The end plates 2, 3 are fitted into the ends of the casing 10. As mentioned above, it is feasible, that the end caps 2, 3 have a conventional single layer structure, but better results are obtained where the end caps also have a multi-layer structure such as that described above for the casing.

To ensure a rigid structure at the ends of the casing, between the inner and outer layers 11, 12, to close the thermally insulating volume, and also to fasten the end plate to the casing (since foam in this region would not have the required compressive strength), a plug or insert 15 of plastic or polymer material may be provided. This is preferably a high temperature resistance, fire-retardant amorphous polymer with good adhesion properties to epoxy, for example, PMI, PPSU or PAI. It is desirable to have such an insert of a material that is more rigid than the foam so as to provide support for the seals to be secured in place and also to allow nuts and bolts 23 or other fasteners to be secured therethrough. The insert may form a groove for a seal such as an elastomer seal or an adhesive bead to ensure that most toxic fumes are exhausted via the burst vent. In one embodiment, the groove has a female radial dovetail configuration with a rectangular cross-section. In an alternative arrangement, sealing may be provided by a tight fit rather than a sealing component.

The mutli-layer structure also allows for continued functionality in the case of BVID (barely visible impact damage) since the foam—particularly if closed cell—and the inner layer 11 act as a seal if the outer layer is damaged. The impact absorption properties of the foam (from a structural perspective) protect the inner skin from damage.

The manufacture of the casing of this disclosure can be automated. The casing may be manufactured as follows:

A mandrel is provided around which a layer of intumescent material is provided.

Next, the inner layer 11 of casing material is provided over the intumescent layer. If this is CFRP, the fibers are wound or braided around the mandrel over the intumescent layer.

A layer of foam or other low density insulative material is then provided over the inner casing layer 11—for example, a foam shape is formed by e.g. machining, molding or thermoforming and is then mounted over the inner casing layer, but preferably not reaching right to the ends. The foam can be applied as several 'slices' to simplify manufacture.

The polymer insert 15 is positioned at the ends of the inner casing layer 11.

The outer casing layer 12 is then provided over the foam e.g. by winding or braiding as above.

An epoxy resin is then preferably injected over the casing structure to seep into the fiber braids to provide a rigid, robust casing. If the foam is a closed cell foam, the resin will not seep into the foam. The leak path via the interface of the insert and the foam may also be sealed by resin or adhesive during the process.

The casing structure of this disclosure will provide sufficient thermal insulation to protect the outer casing layer in the event of thermal runaway whilst also providing an impact resistant structure. The integrity of the sealing is maintained without the need for additional fiber hoop reinforcement at the ends of the casing. The casing can be made of a lightweight casing material thus minimising the size and weight of the casing. The manufacture of the casing can be automated.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A battery cell stack casing comprising:
   casing walls defining a housing interior for receiving a battery cell stack;
   a first end plate provided between the walls at a first end of the casing to close a first end of the housing interior; and
   a second end plate provided between the walls at a second end of the casing to close a second end of the housing interior;
   wherein the casing walls have a multi-layer structure comprising:
      an inner layer having a first side facing into the housing interior and a second opposite side;
      an outer layer spaced outwardly from the second side of the inner layer;
      a thermally insulating volume defined between the second side of the inner layer and the outer layer, the thermally insulating volume being provided with a foam;
      a layer of intumescent material provided on the first side of the inner layer; and
      an insert fitted between and directly adjacent to the inner and outer layers at the ends of the casing walls adjacent the end plates.

2. The casing of claim 1, wherein the insert provides a groove for a seal at the interface between the foam and the inner and outer layers.

3. The casing of claim 2, wherein the groove has a female radial dovetail form with a rectangular cross-section.

4. The casing of claim 2, wherein a seal is mounted in the groove.

5. The casing of claim 4, wherein the seal is an elastomeric seal.

6. The casing of claim 4, wherein the seal is an adhesive bead.

7. The casing of claim 1, wherein the insert is a polymer insert.

8. The casing of claim 1, wherein the foam is a closed-cell foam.

9. The casing of claim 1, wherein the first and second end plates have a multi-layer structure comprising:
   an inner layer having a first side facing into the housing interior and a second opposite side;
   an outer layer spaced outwardly from the second side of the inner layer;
   a thermally insulating volume defined between the second side of the inner layer and the outer layer; and
   a layer of intumescent material provided on the first side of the inner layer.

10. The casing of any preceding claim, wherein the inner and outer layers comprise carbon fiber reinforced polymer (CFRP).

11. A battery unit comprising:
   a casing as claimed in claim 1; and
   a stack of battery cells mounted in the casing.

12. A battery unit as claimed in claim 10, wherein the battery cells are lithium ion cells.

* * * * *